United States Patent
Zhu et al.

(10) Patent No.: US 8,081,755 B2
(45) Date of Patent: *Dec. 20, 2011

(54) JPEG2000 SYNTAX-COMPLIANT ENCRYPTION WITH FULL SCALABILITY

(75) Inventors: Bin Zhu, Edina, MN (US); Shipeng Li, Redmond, WA (US); Yang Yang, Xuzhou (CN)

(73) Assignee: Microsoft Corporation, Redmond, WA (US)

( * ) Notice: Subject to any disclaimer, the term of this patent is extended or adjusted under 35 U.S.C. 154(b) by 1102 days.

This patent is subject to a terminal disclaimer.

(21) Appl. No.: 11/419,468

(22) Filed: May 19, 2006

(65) Prior Publication Data

US 2006/0265601 A1   Nov. 23, 2006

Related U.S. Application Data

(60) Provisional application No. 60/683,111, filed on May 20, 2005.

(51) Int. Cl.
*H04N 7/167* (2006.01)
*H04K 1/04* (2006.01)
*H04K 1/06* (2006.01)
*H04L 9/00* (2006.01)
*H04L 29/06* (2006.01)
*G06F 21/00* (2006.01)

(52) U.S. Cl. ......... 380/217; 380/37; 380/200; 380/239; 380/261; 713/160; 713/184

(58) Field of Classification Search ............ 380/37, 380/200, 217, 239, 261; 713/160, 184
See application file for complete search history.

(56) References Cited

U.S. PATENT DOCUMENTS

| | | | | |
|---|---|---|---|---|
| 6,055,316 A * | 4/2000 | Perlman et al. | ............. | 380/262 |
| 6,996,173 B2 * | 2/2006 | Wu et al. | ............. | 375/240.1 |
| 7,095,782 B1 * | 8/2006 | Cohen et al. | ............. | 375/240.01 |
| 7,136,485 B2 * | 11/2006 | Wee et al. | ............. | 380/37 |
| 7,155,448 B2 * | 12/2006 | Winter | ............. | 707/101 |
| 7,248,740 B2 * | 7/2007 | Sullivan | ............. | 382/232 |
| 7,274,661 B2 * | 9/2007 | Harrell et al. | ............. | 370/229 |
| 7,406,176 B2 * | 7/2008 | Zhu et al. | ............. | 380/200 |
| 7,472,285 B2 * | 12/2008 | Graunke et al. | ............. | 713/193 |
| 7,561,933 B2 * | 7/2009 | Oh et al. | ............. | 700/94 |
| 7,586,425 B2 * | 9/2009 | Ridge et al. | ............. | 341/67 |

(Continued)

OTHER PUBLICATIONS

A. Menezes, P. van Oorschot, and S. Vanstone, "Handbook of Applied Cryptography," 1997 by CRC Press, Inc. chapter 7, pp. 222-282.*

(Continued)

*Primary Examiner* — Carl Colin
*Assistant Examiner* — Catherine Thiaw
(74) *Attorney, Agent, or Firm* — Perkins Coie LLP

(57) ABSTRACT

A method and system is provided for encrypting an image compressed with a JPEG2000-based compression with minimal overhead so that the encrypted codestream is compliant with the syntax of the JPEG2000-based compression and can be scaled without decrypting. The encryption system generates, for each independent encryption segment of a codestream for an image, a unique initialization vector from a global initialization vector in such a way that the initialization vectors can be generated during decryption from the global initialization vector, even after truncation. The encryption system encrypts each independent encryption segment using its unique initialization vector. The encryption system ensures that the encrypted codestream is compliant with the syntax of the JPEG2000-based compression both as originally generated and as truncated by an encryption-unaware device.

15 Claims, 9 Drawing Sheets

U.S. PATENT DOCUMENTS

| | | | |
|---|---|---|---|
| 7,623,656 B2* | 11/2009 | Hawkes et al. | 380/42 |
| 2002/0018565 A1* | 2/2002 | Luttrell et al. | 380/217 |
| 2002/0199099 A1* | 12/2002 | Shirai et al. | 713/160 |
| 2004/0028227 A1* | 2/2004 | Yu | 380/201 |
| 2004/0030665 A1* | 2/2004 | Sullivan | 706/48 |
| 2004/0156433 A1* | 8/2004 | Comer et al. | 375/240.2 |
| 2004/0170277 A1* | 9/2004 | Iwamura et al. | 380/217 |
| 2004/0202322 A1* | 10/2004 | Chavanne et al. | 380/43 |
| 2005/0063380 A1* | 3/2005 | Kayalackakom et al. | 370/389 |
| 2005/0152305 A1* | 7/2005 | Ji et al. | 370/328 |
| 2005/0254656 A1* | 11/2005 | Rose et al. | 380/277 |
| 2006/0133472 A1* | 6/2006 | Bruls et al. | 375/240.1 |
| 2006/0265601 A1 | 11/2006 | Zhu et al. | |
| 2006/0282665 A1 | 12/2006 | Zhu et al. | |
| 2010/0091985 A1* | 4/2010 | Pare et al. | 380/37 |

OTHER PUBLICATIONS

Chun Yuan, Bin B. Zhu, Yidong Wang, Shipeng Li, Yuzhuo Zhong; "Efficient and Fully Scalable Encryption for MPEG-4 FGS"; 2003; 4 pages.*

Shiguo Lian, Jinsheng Sun, Dengfeng Zhang, and Zhiquan Wang; "A Selective Image Encryption Scheme Based on JPEG2000 Codec"; PCM 2004, LNCS 3332, pp. 65-72, 2004.*

Yongdong Wu and Robert H. Deng; "Compliant Encryption of JPEG2000 Codestreams"; Institute for Infocomm Research;2004 International Conference on Image Processing ( U P ); pp. 3439-3442.*

Susie Wee, John Apostolopoulos; "Secure Scalable Streaming and Secure Transcoding with JPEG-2000"; HP Laboratories Palo Alto HPL-2003-117 Jun. 13, 2003; 5 pages.*

Andrea Bittau; "Additional weak IV classes for the FMS attack"; Sep. 12, 2003; 8 pages. "http://www.cs.ucl.ac.uk/staff/a.bittau/sorwep.txt".*

S. Teiwes et al; Request for Comment, RFC 3058; Feb. 2001; 8 pages. "http://www.faqs.org/rfcs/rfc3058.html".*

"Crypto++® Library 5.2.1," 6 pages [last accessed Sep. 27, 2005].

"Gormish Notes on JPEG 2000," 8 pages [last accessed May 11, 2005].

"The JPEG2000 Resource Web Page," VIPER, 5 pages [last accessed Apr. 4, 2005].

Grosbois, Raphael et al., "Authentication and access control in the JPEG 2000 compressed domain," In Proc. of the SPIE 46th Annual Meeting, Applications of Digital Image Processing XXIV, San Diego, Jul. 29-Aug. 3, 2001, pp. 1-10.

Li, Weiping, "Overview of Fine Granularity Scalability in MPEG-4 Video Standard," IEEE Transactions on Circuits and Systems for Video Technology, vol. 11, No. 3, Mar. 2001, pp. 301-317.

Marcellin, Michael et al., "An Overview of JPEG-2000," Proc. of IEEE Data Compression Conference, 2000, pp. 523-541.

Wee, Susie et al., "Secure Scalable Streaming Enabling Transcoding without Decryption," Image Processing International Conference on 2001, vol. 1, pp. 437-440.

Wu, Feng et al., "Smart: An Efficient, Scalable, and Robust Streaming Video System," EURASIP Journal on Applied Signal Processing 2004, 35 pages.

Wu, Hongjun et al., "Efficient and Secure Encryption Schemes for JPEG2000," Proc. IEEE Int. Conf. Acoust. Speech Signal Process, 2004, pp. V-869-V-872.

Wu, Min et al., "Communication-Friendly Encryption of Multimedia," Signal processing, IEEE Workshop, Dec. 9-11, 2002, 4 pages.

Wu, Yongdong et al., "Compliant Encryption of JPEG2000 Codestreams," 2004 IEEE, pp. 3439-3442.

Yuan, Chun et al., "Layered Access Control for MPEG-4 FGS Video," ICIP, International Proceeding Sep. 14-17, 2003, 4 pages.

Zhu, Bin et al., "Encryption and Authentication for Scalable Multimedia: Current State of the Art and Challenges," Proc. SPIE, 2004, 14 pages.

Zhu, Bin et al., "JPEG 2000 Encryption Enabling Fine Granularity Scalability without Decryption," Circuits and Systems, IEEE International Symposium on May 23-26, 2005, vol. 6, 4 pages.

Zhu, Bin et al., "Scalable Protection for MPEG-4 Fine Granularity Scalability," IEEE Transactions on Multimedia, vol. 7, No. 2, Apr. 2005, pp. 222-233.

A. Menezes, P. van Oorschot, and S. Vanstone, "Handbook of Applied Cryptography," 1997 by CRC Press, Inc. chapter 7, pp. 222-282.

Chun Yuan, Bin B. Zhu, Yidong Wang, Shipeng Li, Yuzhuo Zhong; "Efficient and Fully Scalable Encryption for MPEG-4 FGS"; 2003; 4 Pages.

* cited by examiner

JPEG2000 SYNTAX-COMPLIANT ENCRYPTION WITH FULL SCALABILITY

CROSS-REFERENCE TO RELATED APPLICATIONS

This application claims the benefit of U.S. Provisional Patent Application No. 60/683,111, entitled "Syntax Compliant Encryption for JPEG 2000 and Motion JPEG 2000" filed on May 20, 2005 and is related to U.S. application patent Ser. No. 11/419,464 entitled "MPEG-4 Encryption Enabling Transcoding Without Decryption" and filed concurrently, which are hereby both incorporated by reference.

BACKGROUND

Images can be compressed by JPEG2000 (J2K) compression and videos can be compressed by Motion JPEG2000 compression, which are referred to as JPEG2000-based compression. A J2K codestream is organized in a hierarchical structure and provides Fine Granularity Scalability (FGS) that can be truncated to the preset layers (i.e., qualities), resolutions, components, tiles, etc., or to coding passes inside a packet to fit a large variety of application scenarios. Motion JPEG 2000 encodes each video frame independently using a J2K codestream.

FIG. 1 is a block diagram that illustrates divisions of an image according to JPEG2000. An image is divided into one "component" 101 for each color. For example, if the image is an RGB image, then it has a red component, a green component, and a blue component. Each component is divided into "tiles" 102 that each represent an area of the component. For example, a component may be divided into four equally sized tiles as shown in FIG. 1: upper left, upper right, lower left, and lower right portions of the component. Each tile is compressed separately. To compress a tile, it is decomposed using a discrete wavelet transform into four subbands 103: a low-low ("LL") subband, a low-high ("LH") subband, a high-low ("HL") subband, and a high-high ("HH") subband. The LL subband represents a low pass transformation of the image in both the horizontal and vertical directions, the LH subband represents a low pass transformation of the image in the horizontal direction and a high pass transformation of the image in the vertical direction, and similarly for the HL and HH subbands. After the tile is decomposed, the LL subband can then be further decomposed using a discrete wavelet transform into four subbands. The LL subband of the LL subband is again decomposed into four subbands. The decomposing of the LL subband continues for a number of resolution levels 104. The final LL subband is referred to as the resolution level 0 subband. It is also the image at resolution 0. The image at resolution 1 consists of the image at resolution 0 plus the subbands of resolution 1. More generally, the image at resolution r (when r>0) consists of the image of resolution r−1 and the subbands at resolution level r. When the compression is lossy, the wavelet coefficients are quantized.

FIG. 2 is a diagram that illustrates divisions of a decomposed image that are used for encoding. To encode the decomposed image, each subband of a tile 201 is divided into non-overlapping rectangular blocks, referred to as "code-blocks" 202. Each code-block is independently arithmetically encoded from the most significant bitplane to the least significant bitplane. Each bitplane is encoded using an embedded block coding with an optimized truncation ("EBCOT") technique with three passes: a significant propagation pass, a magnitude refinement pass, and a cleanup pass. The arithmetic encoding is terminated at the end of the last bitplane, and the encoded bitstream forms an arithmetic codeword segment ("ACS"). JPEG2000 also allows termination at the end of each coding pass such that each coding pass generates an ACS. The context data for the EBCOT technique can be initialized at the end of each sub-bitplane coding pass to allow independent decoding of the bitstream from each coding pass. JPEG2000 has an optional coding bypass that inserts raw data into the bitstream for certain coding passes resulting in a raw coding segment ("RCS"). The boundaries between arithmetic coding passes and raw passes are terminated.

JPEG2000 specifies that a code-block's bitstream is distributed across one or more layers in a codestream. A layer consists of a number of consecutive bit-plane coding passes from each code-block in a tile including all subbands of all components for that tile. JPEG2000 defines an intermediate space-frequency structure known as a "precinct" 203. A precinct is a group of spatially contiguous code-blocks from the LH, HL, and HH subbands of a resolution level.

A JPEG2000 codestream consists of "packets." Each packet is a continuous segment in the compressed codestream representing a component, specific tile, layer, resolution level, and precinct. Each packet can be uniquely identified by tile, component, resolution level, layer, and precinct. JPEG2000 allows for various coding progression orders for a tile based on component, resolution level, layer, and precinct.

A packet header contains the data length of each Code-block Contribution to the Packet ("CCP"). JPEG2000 does not allow within an ACS or a CCP a byte-aligned value between 0xFF90 and 0xFFFF for any two consecutive bytes or ending with a byte value of 0xFF. A RCS does not allow any byte-aligned nine consecutive bits of 1 or ending with a byte of value 0xFF. JPEG2000 uses the unattainable range of two consecutive bytes to represent unique markers to facilitate organization and parsing of the bitstream and to improve error resilience.

Encryption can be applied to J2K codestreams to protect images from unauthorized access or usage. An important requirement for encryption of scalable codestreams is that the encrypted codestream should preserve as fine as possible granularity for scalability so that it can be truncated directly by an encryption-unaware device without decryption. In other words, as an image is processed by intermediaries, it is desirable that those intermediaries can reduce scale (e.g., resolution) of the image without having to decrypt the image. A desirable requirement for JPEG2000 encryption is that an encrypted J2K codestream is still compliant to JPEG2000 syntax and that encrypted data does not emulate any JPEG2000 delimiters to avoid erroneous parsing or synchronization, especially under error-prone transmissions.

SUMMARY

A method and system is provided for encrypting media data compressed using a compression scheme, such as an image compressed with JPEG2000 or a video compressed with Motion JPEG2000, with minimal overhead so that the encrypted codestream is still compliant with the syntax of the compression scheme and can be scaled without decrypting. The encryption system encrypts each codeword segment or each intersection of a codeword segment with a CCP independently with a syntax-compliant encryption primitive after compression. It generates, for each codeword segment of a codestream for the image, a unique initialization vector ("IV") from a global IV in such a way that the IVs can be generated during decryption from the global IV. The encryption system encrypts each codeword segment using its unique initialization vector. The encryption system ensures that the encrypted codestream is syntax compliant both as originally generated and as truncated by an encryption-unaware device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
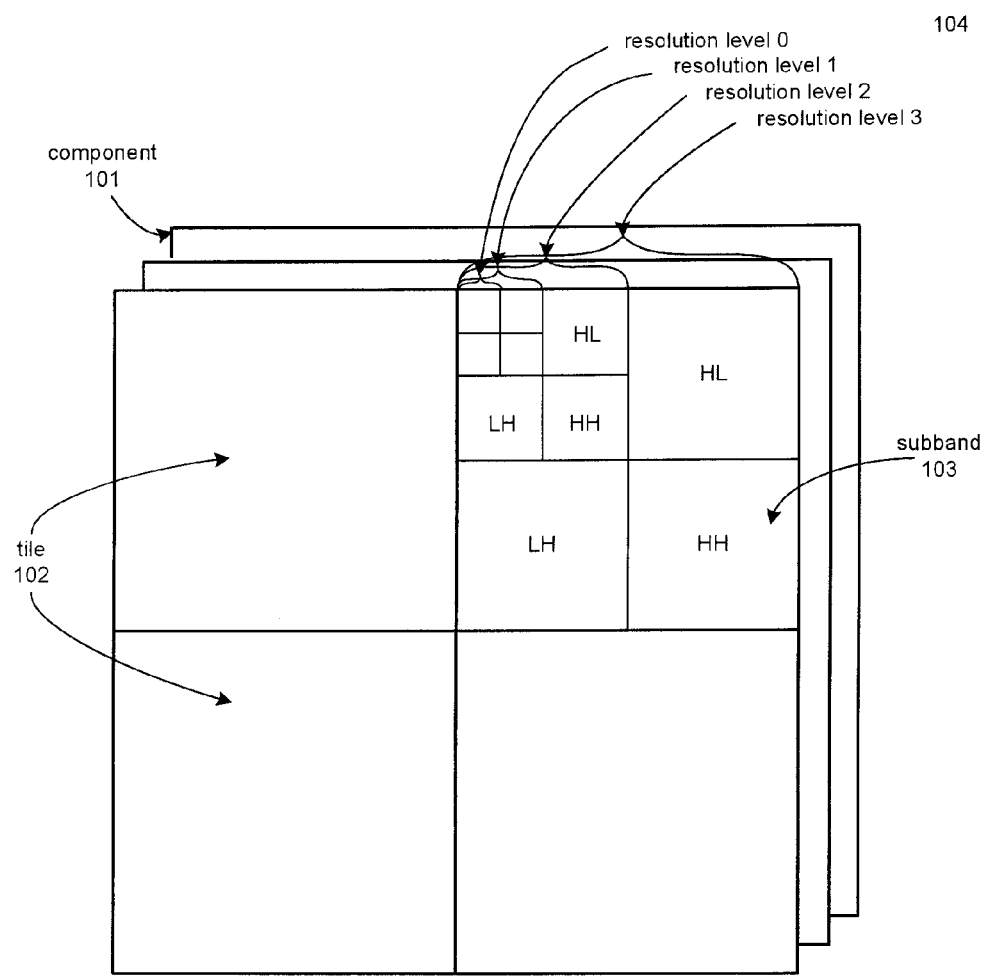
FIG. 1 is a block diagram that illustrates divisions of an image according to JPEG2000.
Figure 2:
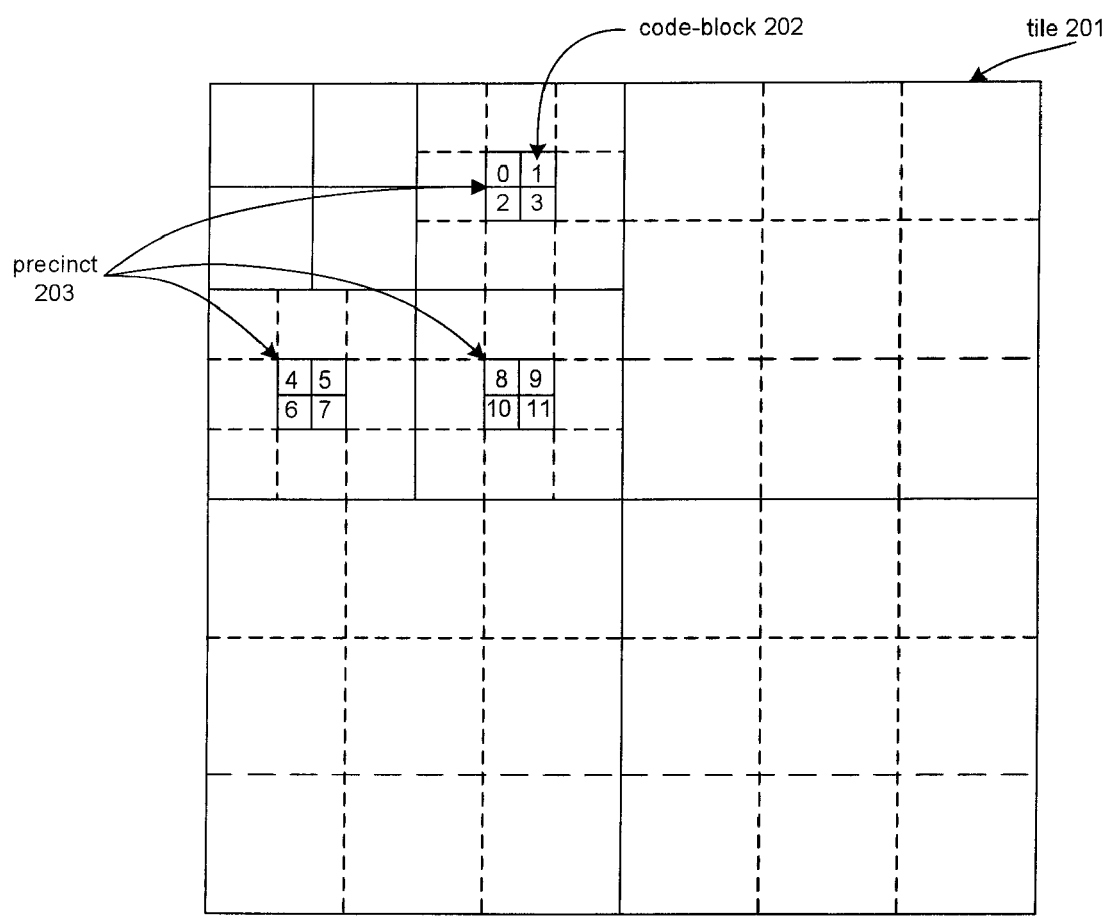
FIG. 2 is a diagram that illustrates divisions of a decomposed image that are used for encoding.

A method and system is provided for encrypting an image compressed with JPEG2000 or a video compressed with Motion JPEG2000 with minimal overhead so that the encrypted codestream is compliant with the syntax of JPEG2000 or Motion JPEG2000 and can be scaled without decrypting. In one embodiment, the encryption system identifies codeword segments of an image compressed with JPEG2000 that are derived from the code-blocks of the image. The encryption system generates, for each codeword segment, a unique initialization vector from a global initialization vector in such a way that the initialization vectors can be correctly generated during decryption from the global initialization vector even when the encrypted codestream is truncated. For example, a unique initialization vector may be derived from the global initialization vector and a unique identifier of the codeword segment. Thus, the encryption system need only add the global initialization vector to the codestream of an encrypted image. The encryption system encrypts each codeword segment using its unique initialization vector. The encryption system may ensure that the codestream is JPEG2000 syntax compliant by switching consecutive non-compliant bytes or by iteratively encrypting data until it is syntax compliant. The encryption system also ensures that when a codestream is truncated (e.g., by an encryption-unaware device), the remaining code stream is still compliant to the JPEG2000 syntax and can be successfully decrypted. In this way, the encryption system can ensure that an encrypted image is JPEG2000 syntax compliant and is fully scalable.

In one embodiment, the encryption system uses a locally iterative encryption ("LIE") for a block-based chaining encryption. Using LIE, the encryption system encrypts a block of plaintext iteratively until the ciphertext is JPEG2000 syntax compliant. The encryption system uses Cipher Block Chaining ("CBC") mode to encrypt full blocks and uses Cipher Feedback ("CFB") mode to encrypt the last partial block. To encrypt the last partial block, the encryption system initializes the encryption register with either the last full block or the initialization vector ("IV") if there is no last full block. The encryption system can thus use LIE to encrypt plaintext of any length into ciphertext of the same length.

In one embodiment, when an entire code-block is a single codeword segment, the encryption system may partition the ciphertext of the encrypted codeword segment into CCPs. The encryption system ensures that each CCP is terminated so that it can be decrypted correctly when the bitstream is truncated at the CCP. In particular, neither the plaintext nor the ciphertext of a CCP can end with a byte value of 0xFF. After encryption, the encryption system may need to modify the original CCP partition points obtained without encryption. When the encryption system uses LIE in CBC mode, the encryption system terminates a CCP at a block boundary of the cipher block used in LIE.

In one embodiment, the encryption system uses ciphertext switching encryption ("CSE") for stream-based encryption. When CSE is used, the encryption system avoids splitting a switched portion into two consecutive CCPs. If the last byte of the ciphertext is not 0xFF with the original partitioning, then the encryption system does not change the CCP boundary when encrypting. If the last byte of the ciphertext is, however, 0xFF, the encryption system moves the boundary to the following byte that is not 0xFF in both plaintext and ciphertext. The moving of the boundary does result in compression overhead but only of about one byte every 256 CCPs. When the encryption system needs to move a boundary to avoid splitting switched consecutive bytes, it typically moves the boundary one byte resulting in a one byte overhead for the CCP.

In one embodiment, the encryption system encrypts each intersection of a codeword segment with a CCP independently with either LIE or CSE in the same way as described previously. This does not generate any compression overhead. The original CCP partition without encryption is preserved after encryption in this embodiment. Another advantage is that the encryption and decryption can also be executed in situ.

In one embodiment, the encryption system generates a distinct initialization vector for each independent encryption. The encryption system uses the identifier of a code-block and index of the first coding pass of the encryption segment to generate the IV. The encryption system uniquely identifies a code-block by tile, component, resolution level, precinct, subband, and the coordinate of the upper left point of the code-block. The encryption system inserts a global IV into the main header of the encrypted codestream. If the encryption system is used for Motion JPEG2000, then it inserts an independent random frame IV into each frame. The encryption system generates a distinct IV by concatenating and cryptographically hashing the global or frame IV, the unique code-block identifier, and the index to the first coding pass of the encryption segment. In one embodiment, the encryption system represents the code-block identifier and the coding pass index as a single word of length equal to the IV. The system may generate each distinct IV by XORing the global IV with the single word.

The encryption system fully encrypts the data of a JPEG2000 codestream while allowing full scaling and cropping of the image. As a result, an encryption-unaware decoder can decode the encrypted codestream, although the decoded data would be visually meaningless because it is encrypted. Also, an encryption-unaware intermediary device can crop or scale the image. An intermediary device can crop an image by simply dropping tiles and adjusting some coordinates and parameters. Since the IVs are generated only from the global IV and a tile itself, the dropping of a tile does not affect the ability to decode or decrypt the codestream. Other truncations allowed by an unencrypted J2K codestream can also be applied to the encrypted J2K codestream with the described encryption method and system.

Figure 3:
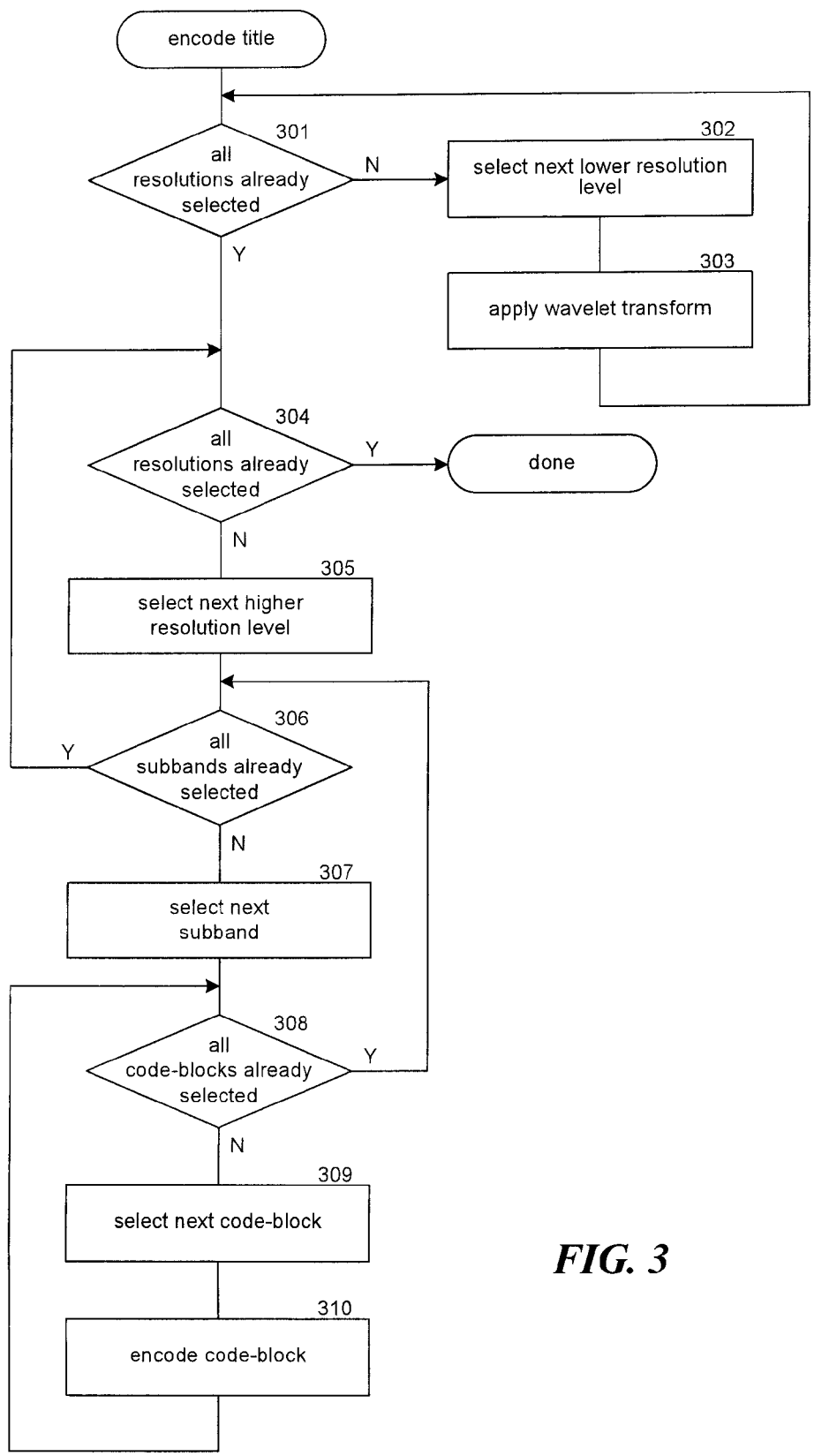
FIG. 3 is a flow diagram that illustrates the processing of a component that encodes a title of an image in one embodiment.

FIG. 3 is a flow diagram that illustrates the processing of a component that encodes a tile of an image in one embodiment. The component loops applying a wavelet transformation for each resolution level and encodes the code-blocks within the resolution levels. In blocks 301-303, the component loops selecting each resolution level from high to low resolution and applying wavelet transform to generate a multi-resolution representation of the image tile. In decision block 301, if all the resolution levels have already been selected, then the component continues at block 304 to start encoding each code-block, else the component continues at block 302. In block 302, the component selects the next lower resolution level. In block 303, the component applies a wavelet transformation for the selected resolution level and then loops to block 301. In blocks 304-310, the component loops selecting each resolution level from low to high, selecting each subband at each resolution level, and encoding the code-blocks of the selected subband. In decision block 304, if all the resolution levels have already been selected, then the component completes, else the component continues at block 305. In block 305, the component selects the next higher resolution level. In decision block 306, if all the subbands of the selected resolution level have already been selected, then the component loops to block 304 to select the next resolution level, else the component continues at block 307. In block 307, the component selects the next subband of the selected resolution level. In decision block 308, if all the code-blocks of the selected subband have already been selected, then the component loops to block 306 to select the next subband, else the component continues at block 309. In block 309, the component selects the next code-block of the selected subband. In block 310, the component encodes the selected code-block and then loops to block 308 to select the next code-block.

Figure 4:
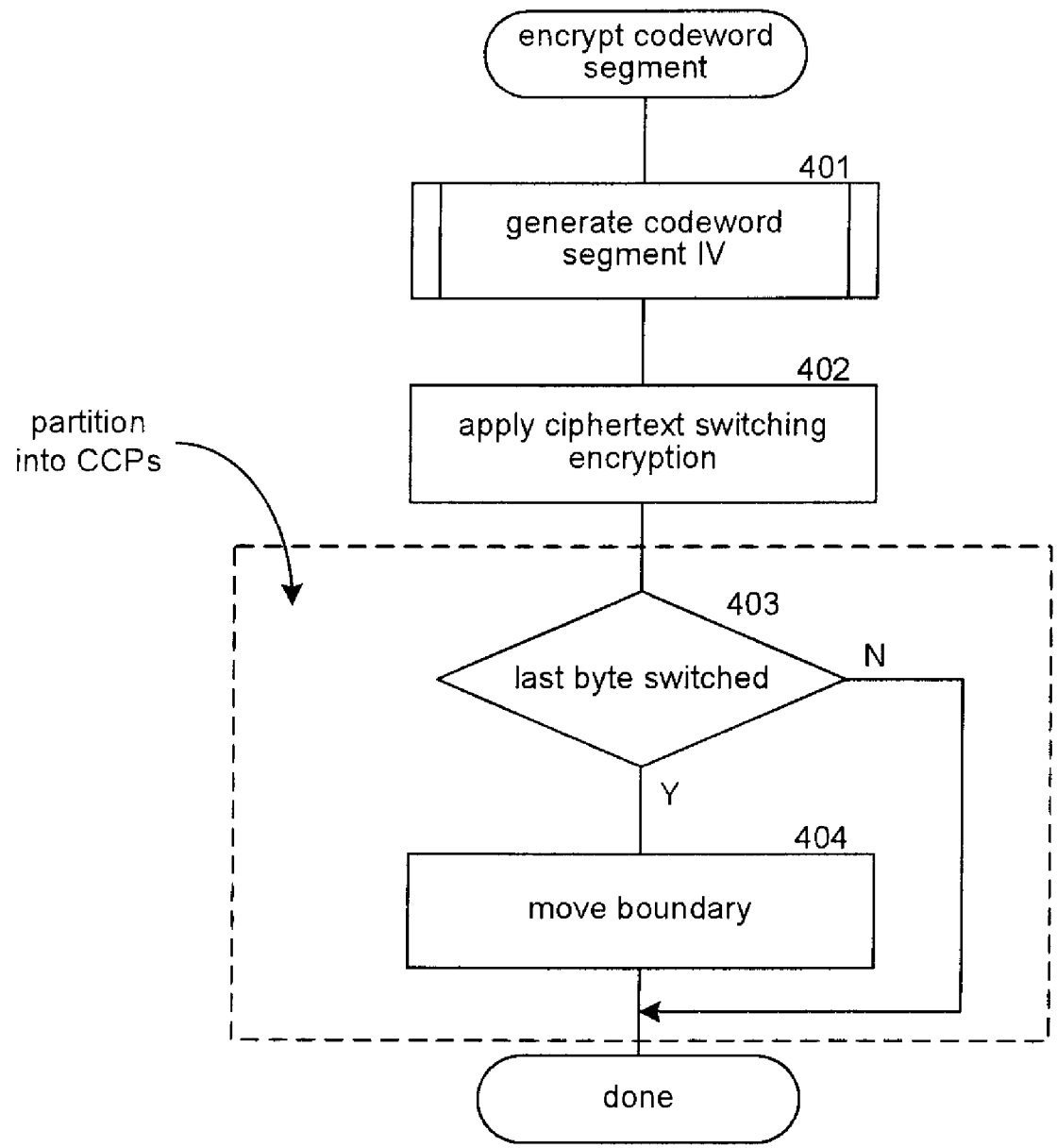
FIG. 4 is a flow diagram that illustrates the processing of a component that encrypts a codeword segment in one embodiment.

FIG. 4 is a flow diagram that illustrates the processing of a component that encrypts a codeword segment in one embodiment. The component is invoked when a codeword segment is generated during compression. In block 401, the component invokes the generate codeword segment initialization vector component to generate an initialization vector for the codeword segment. In block 402, the component applies a ciphertext switching encryption algorithm to the codeword segment using the generated initialization vector. In blocks 403-404, the component partitions the encrypted codeword segment into CCPs distributed into packets. In decision block 403, if the last byte of the original CCP without encryption needs to be switched, then the component continues at block 404, else the component completes. In block 404, the component moves the boundary so that the last byte does not need to be switched. The component then completes. Alternatively, the component may apply a locally iterative encryption ("LIE") algorithm to encrypt each codeword segment to ensure that the encrypted bytes are syntax-compliant. In this case, the boundary of a CCP should be aligned with the boundary of an encryption block of the block cipher used in the LIE algorithm.

Figure 5:
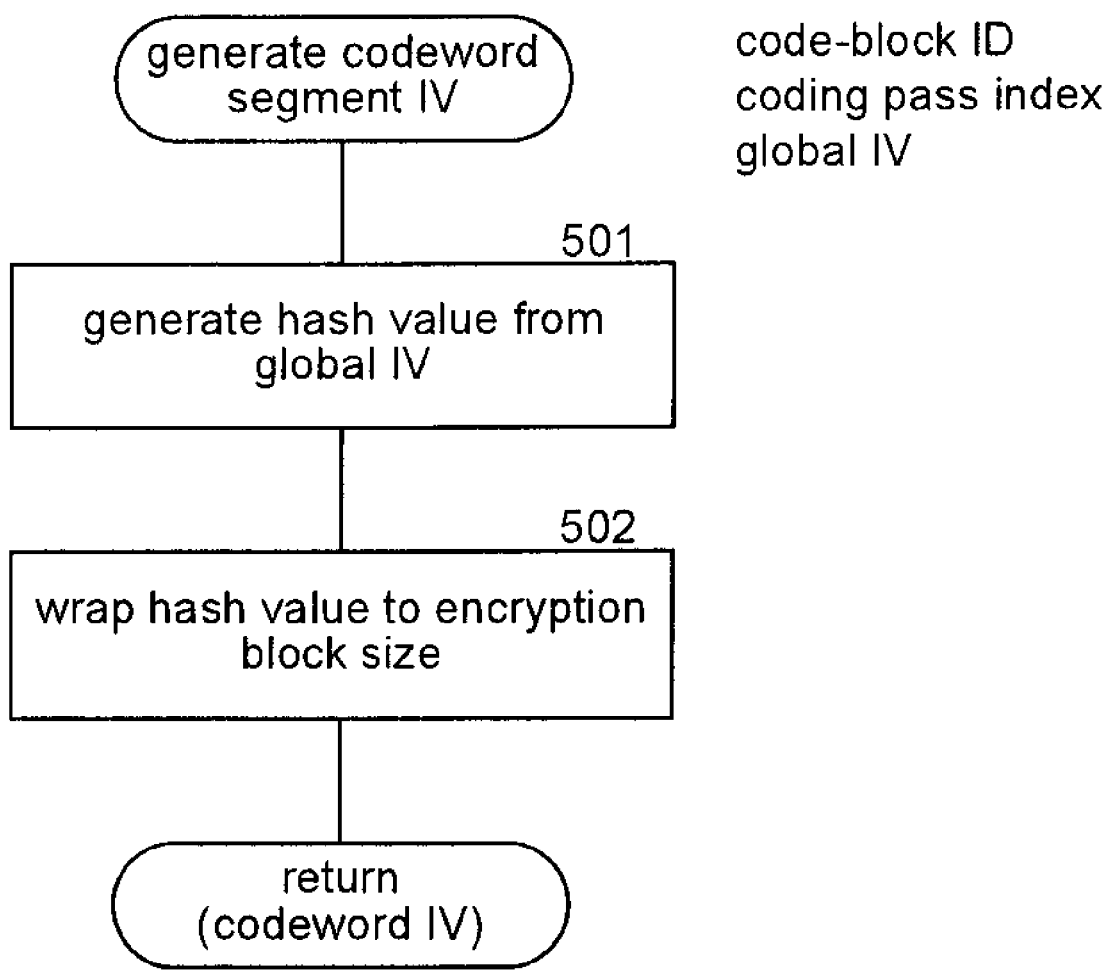
FIG. 5 is a flow diagram that illustrates the processing of the generate codeword segment initialization vector component in one embodiment.

FIG. 5 is a flow diagram that illustrates the processing of the generate codeword segment initialization vector component in one embodiment. The component is passed a global initialization vector, a code-block identifier, and a coding pass index of the codeword segment and returns an initialization vector for the codeword segment. In block 501, the component generates a hash value from the global initialization vector, the code block identifier, and the coding pass index. In block 502, the component may wrap the hash to the size of the encryption block to generate the codeword segment initialization vector. The component then returns the generated codeword initialization vector.

Figure 6:
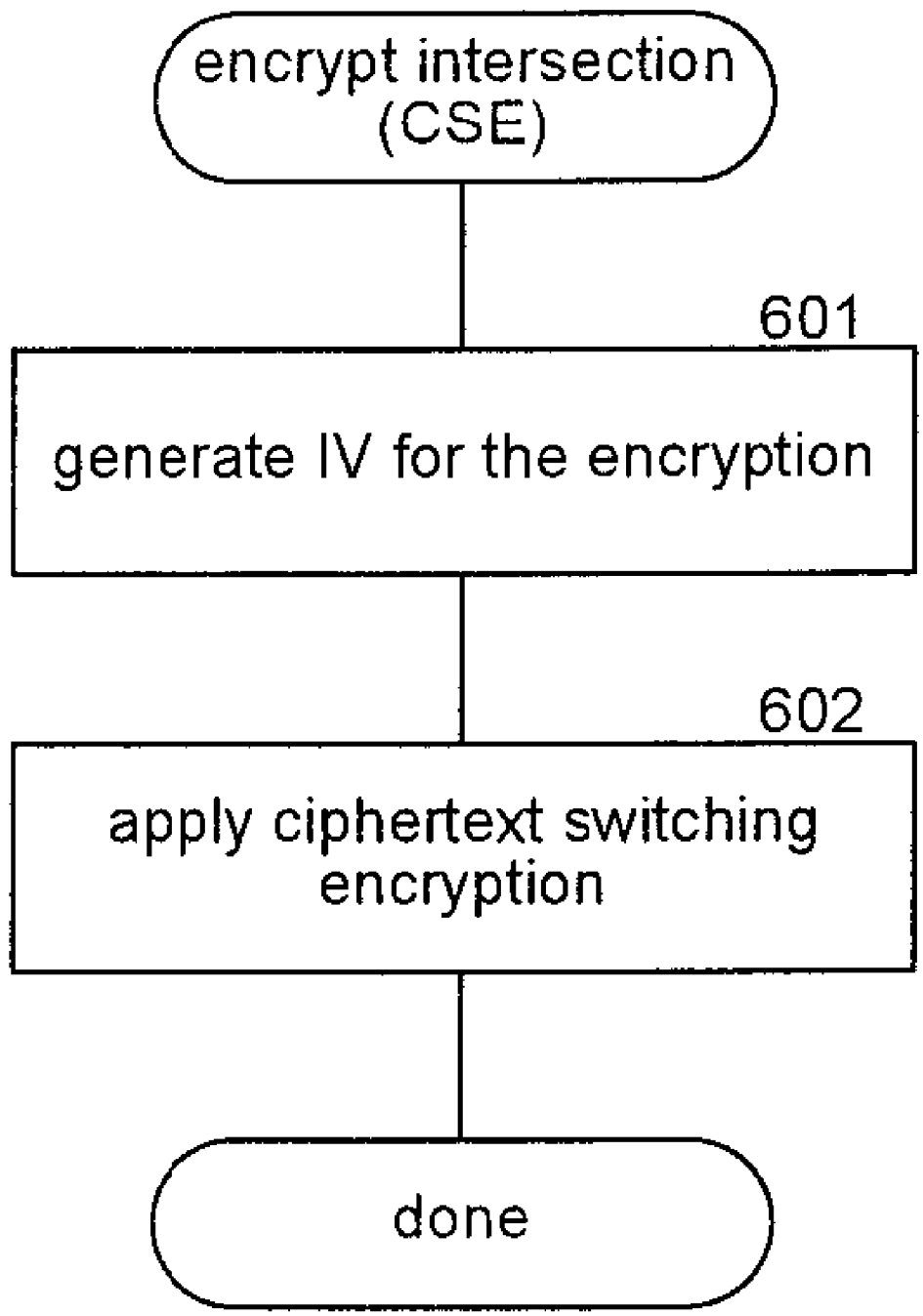
FIG. 6 is a flow diagram that illustrates the processing of a component that encrypts an intersection of a codeword segment and a CCP in one embodiment.

FIG. 6 is a flow diagram that illustrates the processing of a component that encrypts an intersection of a codeword segment with a CCP using a CSE algorithm in one embodiment. The component is invoked when an intersection of a codeword segment and a CCP is generated. In block 601, the component generates the initialization vector for the encryption from the global initialization vector and the unique ID that identifies the intersection of the codeword segment and the CCP. In block 602, the component applies a ciphertext switching encryption algorithm to the data of the intersection to generate syntax-compliant ciphertext. The component then completes.

Figure 7:
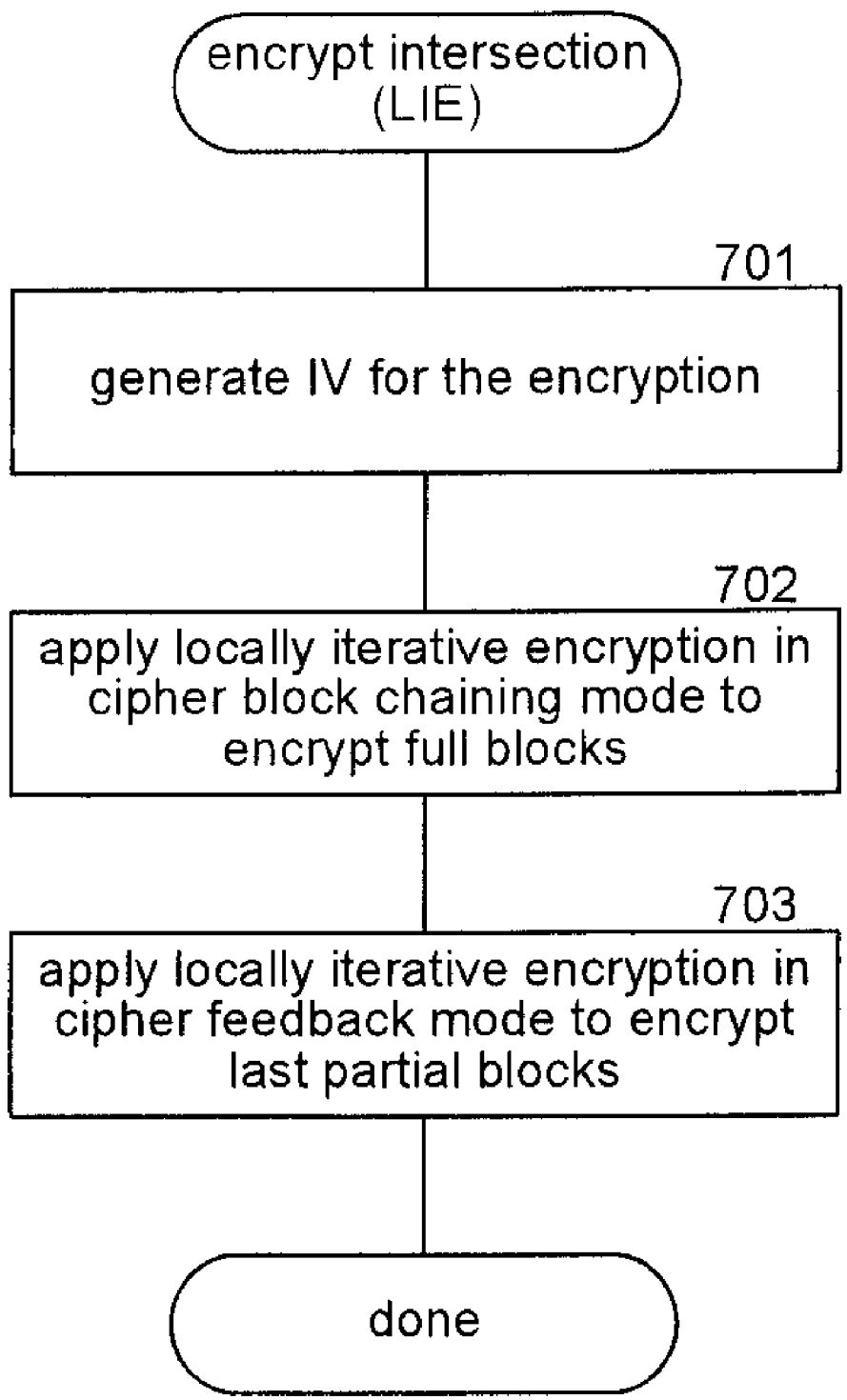
FIG. 7 is a flow diagram that illustrates the processing of a component that encrypts an intersection of a codeword segment and a CCP in another embodiment.

FIG. 7 is a flow diagram that illustrates the processing of a component that encrypts an intersection of a codeword segment with a CCP using an LIE algorithm in another embodiment. The component is invoked when an intersection of a codeword segment and a CCP is generated. In block 601, the component generates the initialization vector for the encryption from the global initialization vector and the unique ID that identifies the intersection of the codeword segment and the CCP as in block 601. In block 702, the component applies a locally iterative encryption algorithm in cipher block chaining mode to encrypt full blocks. In block 703, the component applies a locally iterative encryption algorithm in cipher feedback mode to encrypt the last partial block. The component then completes.

Figure 8:
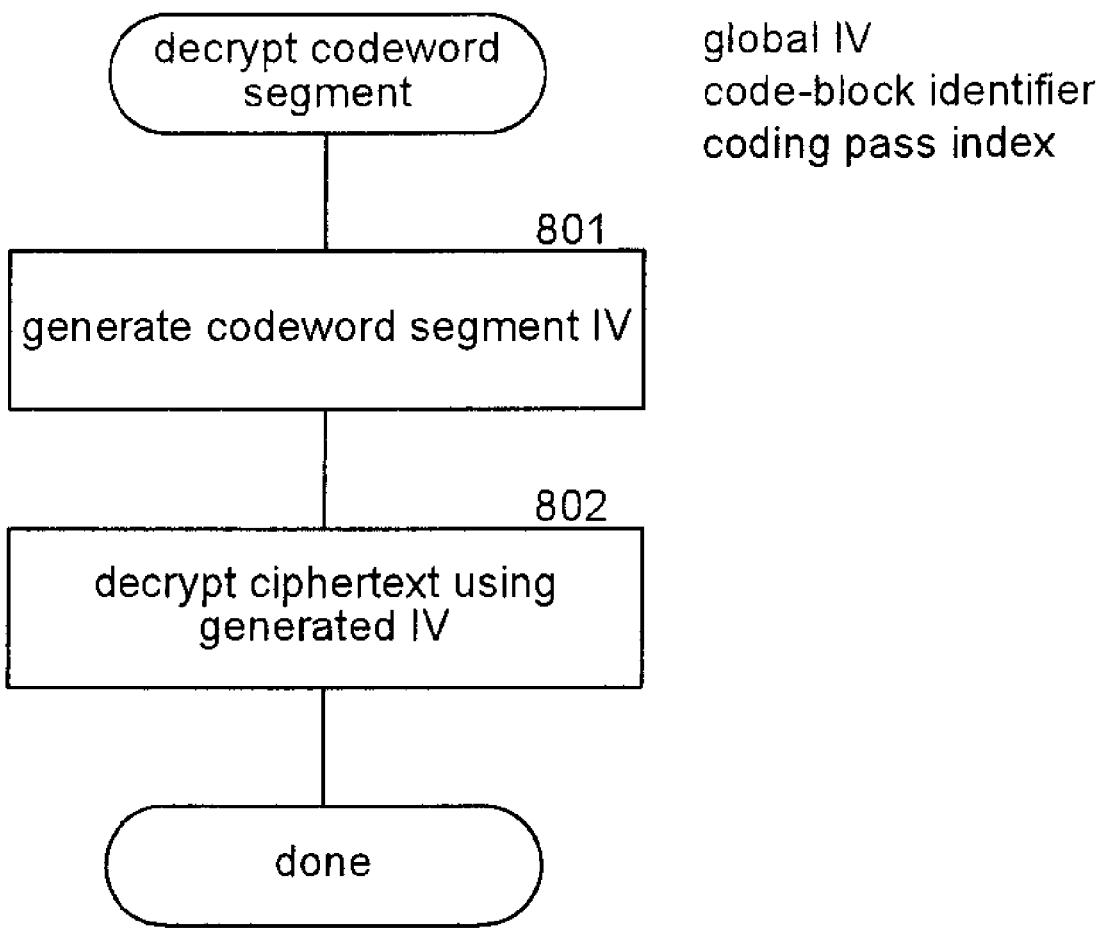
FIG. 8 is a flow diagram that illustrates the processing of a component that decrypts a codeword segment in one embodiment.

FIG. 8 is a flow diagram that illustrates the processing of a component that decrypts a codeword segment in one embodiment. The component is passed an encrypted codeword segment along with a global initialization vector, a code-block identifier, and a coding pass index of the codeword segment and returns the decrypted data of the codeword segment. In block 801, the component invokes the generate codeword segment initialization vector component to generate the initialization vector for the codeword segment. In block 802, the component decrypts the codeword segment using the initialization vector and then completes.

Figure 9:
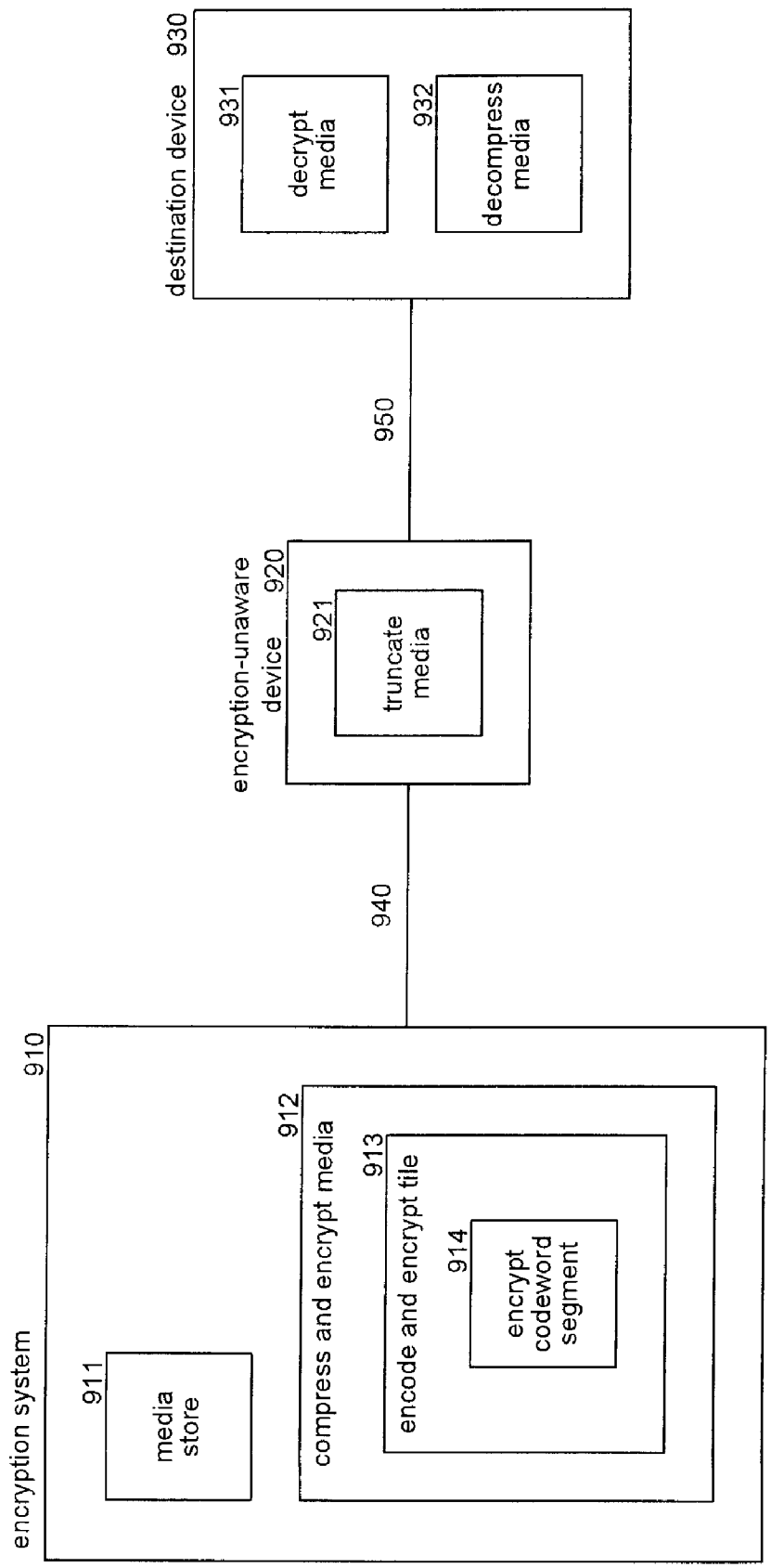
FIG. 9 is a block diagram that illustrates components of the encryption system in one embodiment.

FIG. 9 is a block diagram that illustrates components of the encryption system in one embodiment. The encryption system 910 is connected to a destination device 930 via communications links 940 and 950 and an encryption-unaware device 920. The encryption system may compress media data of a media store 911 using a compress media and encrypt component 912. The compress media and encrypt component invokes the encode tile component 913 to encode the tile into a compressed bitstream. An encrypt codeword segment component 914 is invoked by the compress media component to encrypt codeword segments. After the encryption system encrypts the compressed media data, it forwards the compressed media data to the encryption-unaware device via communications link 940. Because the encrypted media data is still syntax compliant with the compression technique, the encryption-unaware device can truncate the media data in some way that is consistent with the compression scheme using a truncate media component 921. The encryption-unaware device could also display the truncated media data, although it would be in an encrypted form. The encryption-unaware device forwards the truncated media data to the destination device via communications link 950. The destination device can decrypt the truncated media data using a decrypt media component 931 and decompress the decrypted media data using a decompress media component 932. The destination device can then display the media.

The encryption system may be implemented in silicon, using discrete logic, a microprocessor, or other computing devices. The computing device on which the encryption system is implemented may include a central processing unit, memory, input devices (e.g., keyboard and pointing devices), output devices (e.g., display devices), and storage devices (e.g., disk drives). The memory and storage devices are computer-readable media that may contain instructions that implement the encryption system.

The encryption system may be implemented in various operating environments that include personal computers, server computers, multiprocessor systems, microprocessor-based systems, programmable consumer electronics, network PCs, minicomputers, mainframe computers, distributed computing environments that include any of the above systems or devices, and the like.

The encryption system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments and may be implemented in hardware or software.

Although the subject matter has been described in language specific to structural features and/or methodological acts, it is to be understood that the subject matter defined in the appended claims is not necessarily limited to the specific features or acts described above. For example, the principles of the encryption system may be used in conjunction with a variety of media and multimedia types and compression schemes. As an example, multimedia data may include a movie with both video and audio. The media data may be derived from a media signal or transmitted via a media signal. Also, JPEG2000-based compression refers to any compression scheme that is compatible with or derived from JPEG2000 compression. Accordingly, the invention is not limited except as by the appended claims.

We claim:

1. A method performed by a computing device for encrypting media data, the media data and the encrypted media data being a JPEG2000 compliant image, the method comprising:
providing a global initialization vector for the media data;
adding the generated global initialization vector to a header of the media data;
identifying independent encryption segments of the media data, the independent encryption segments being codeword segments from code-blocks of the media data; and
for each identified independent encryption segment,
generating by the computing device an initialization vector for the independent encryption segment that is derived from the global initialization vector and from a unique identifier of the independent encryption segment; and
encrypting by the computing device the data of the independent encryption segment using the generated initialization vector for the independent encryption segment, the encrypted data being syntax-compliant with JPEG2000,
wherein the header with the global initialization vector and the encrypted data of each independent encryption segment without the initialization vector for each independent encryption segment form an encrypted JPEG2000 compliant image that can be truncated without having to decrypt the encrypted data of the independent encryption segments.

2. The method of claim 1 wherein the encryption scheme is a locally iterative encryption scheme.

3. The method of claim 2 wherein the locally iterative encryption scheme in cipher block chaining mode is applied to full encryption blocks and the locally iterative encryption scheme in cipher feedback mode is applied to a last partial encryption block.

4. The method of claim 1 wherein the encryption scheme is a ciphertext switching scheme.

5. The method of claim 1 wherein the unique identifier of the code-block includes an indication of tile, component, resolution level, precinct, subband, and coordinate of the upper left point of the code-block.

6. The method of claim 1 wherein the unique identifier is a combination of a code-block identifier and a coding pass index and the generating of the initialization vector includes XORing the global initialization vector with the unique identifier.

7. A system for encrypting media data so that it is compliant with a JPEG2000-based compression, comprising:
a memory storing computer-executable instructions of:
a component that identifies a global initialization vector for the media data;
a component that identifies code-blocks of the media data;
a component that identifies codeword segments of the code-blocks;
a component that identifies independent encryption segments from the codeword segments;
a component that generates an initialization vector for each independent encryption segment that is derived from the global initialization vector and from a unique identifier of the independent encryption segment;
a component that independently encrypts data of each independent encryption segment using the generated initialization vector for the independent encryption segment so that each encrypted independent encryption segment is JPEG2000-syntax compliant by iteratively encrypting the data of each independent encryption segment until the encrypted independent encryption segment is JPEG2000-syntax compliant;
a component that partitions code-blocks into code-block contributions to a packet so that when a bitstream is terminated at a code-block contribution to a packet, the remaining code-block contributions to a packet are JPEG2000-syntax compliant and can be decrypted; and
a component that generates a codestream that includes the identified global initialization vector; and
a processor for executing the computer-executable instructions stored in the memory.

8. The system of claim 7 wherein an independent encryption segment is a codeword segment from a code-block of a JPEG2000-based compression.

9. The system of claim 7 wherein an independent encryption segment is an intersection of a codeword segment and code-block contribution to a packet of JPEG2000-based compression.

10. The system of claim 7 wherein the component that encrypts generates syntax-compliant ciphertexts.

11. The system of claim 10 wherein the component that encrypts applies a locally iterative encryption scheme.

12. The system of claim 10 wherein the component that encrypts applies a ciphertext switching scheme.

13. The system of claim 7 wherein an independent encryption segment is either a codeword segment of a code-block or an intersection of a codeword segment and code-block contribution to a packet of JPEG2000-based compression, and the unique identifier of an independent encryption segment is a unique identifier of the code-block and an index to a first coding pass of the encryption segment.

14. A computer-readable medium containing a syntax-compliant encryption of data that is compressed using a JPEG2000-based compression, the syntax-compliant encryption being generated by a method comprising:
identifying a global initialization vector for the data; identifying code-blocks of the data;
identifying codeword segments of the code-blocks; identifying independent encryption segments from the code-blocks; for each identified independent encryption segment, generating an initialization vector for the independent encryption segment that is derived from the global initialization vector and from a unique identifier of the independent encryption segment; and
encrypting the data in the encryption segment using the generated initialization vector to generate ciphertext that is compliant with the syntax of a JPEG2000-based compression; and
generating a codestream that includes the identified global initialization vector and the encrypted data,
wherein each independent encryption segment is encrypted independently so that when an independent encryption segment is truncated from the data without decrypting the data, the non-truncated data is JPEG2000-syntax compliant and can be decrypted.

15. The computer-readable medium of claim 14 wherein an encryption segment is either a codeword segment of a code-block or an intersection of a codeword segment and code-block contribution to a packet of a JPEG2000-based compression, and the initialization vector for an independent encryption segment is generated from an image or frame initialization vector and a unique identifier of the code-block from which the codeword segment is generated and an index to a first coding pass of the encryption segment.

* * * * *